(12) United States Patent
Vescovi (10) Patent No.: US 10,752,233 B2
(45) Date of Patent: Aug. 25, 2020

(54) METHOD FOR LEVITATION OF AN OBJECT

(71) Applicant: Vescovi Innovations, LLC, Pittsburgh, PA (US)

(72) Inventor: Patrick E. Vescovi, Pittsburgh, PA (US)

(73) Assignee: Vescovi Innovations, LLC, Pittsburgh, PA (US)

( * ) Notice: Subject to any disclaimer, the term of this patent is extended or adjusted under 35 U.S.C. 154(b) by 168 days.

(21) Appl. No.: 16/183,049

(22) Filed: Nov. 7, 2018

(65) Prior Publication Data

US 2019/0071064 A1    Mar. 7, 2019

Related U.S. Application Data

(62) Division of application No. 15/412,125, filed on Jan. 23, 2017, now Pat. No. 10,155,507.

(60) Provisional application No. 62/288,093, filed on Jan. 28, 2016.

(51) Int. Cl.
*B60V 1/10* (2006.01)
*B60V 1/15* (2006.01)
*B60V 3/02* (2006.01)

(52) U.S. Cl.
CPC ............... *B60V 1/10* (2013.01); *B60V 1/15* (2013.01); *B60V 3/02* (2013.01)

(58) Field of Classification Search
CPC .... B60V 1/00; B60V 1/02; B60V 1/04; B60V 1/043; B60V 1/046; B60V 1/10
See application file for complete search history.

(56) References Cited

U.S. PATENT DOCUMENTS

| | | | |
|---|---|---|---|
| 2,364,677 | A | 12/1944 | Warner |
| 2,567,392 | A | 9/1951 | Naught |
| 3,085,770 | A | 4/1963 | Sutton |
| 3,237,708 | A | 3/1966 | Strasser et al. |
| 3,237,892 | A | 3/1966 | Elliott et al. |
| 3,252,534 | A | 5/1966 | Shaw |
| 3,263,764 | A | 8/1966 | Bertin |
| 3,276,529 | A | 10/1966 | Latimer-Needham |
| 3,417,943 | A | 12/1968 | Page et al. |
| 3,486,718 | A | 12/1969 | Marchal et al. |

(Continued)

FOREIGN PATENT DOCUMENTS

| | | |
|---|---|---|
| CA | 2112067 A1 | 6/1994 |
| CA | 2187678 A1 | 4/1998 |

(Continued)

*Primary Examiner* — Kevin Hurley
(74) *Attorney, Agent, or Firm* — The Webb Law Firm (57) ABSTRACT

A method for levitation includes flowing a source gas through an orifice to produce a Venturi effect as the source gas exits an outlet, entraining a secondary gas comprising ambient air, creating a pressure decrease at a secondary inlet of the secondary gas, mixing the source gas and the secondary gas to form a tertiary gas mixture, with the tertiary gas mixture including the source gas and the secondary gas, and with the source gas and the secondary gas mixed in a flow conduit having a constricted section of decreasing diameter and increasing diameter, flowing the tertiary gas mixture through an outlet, creating a pressure increase at the outlet, and inducing levitation through creation of a pressure decrease at the secondary inlet of the secondary gas and a pressure increase at the outlet of the tertiary gas mixture.

12 Claims, 10 Drawing Sheets

(56) References Cited

U.S. PATENT DOCUMENTS

| | | |
|---|---|---|
| 3,587,773 A | 6/1971 | Bertin |
| 3,591,084 A | 7/1971 | Ahren |
| 3,601,214 A | 8/1971 | Bertin |
| 3,698,350 A | 10/1972 | Gehlen |
| 3,931,864 A | 1/1976 | Desbarats |
| 3,931,942 A | 1/1976 | Alpert |
| 3,953,321 A | 4/1976 | Ganster et al. |
| 4,192,461 A | 3/1980 | Arborg |
| 4,249,334 A | 2/1981 | Goldfarb et al. |
| 4,433,745 A | 2/1984 | Rollins et al. |
| 4,615,407 A | 10/1986 | Wilson et al. |
| 5,067,762 A | 11/1991 | Akashi |
| 5,295,643 A | 3/1994 | Ebbert et al. |
| 6,260,802 B1 | 7/2001 | Hampsten |
| 6,547,180 B1 | 4/2003 | Cassidy |
| 7,210,549 B2 | 5/2007 | Inkster |
| 7,306,066 B2 | 12/2007 | Trojahn |
| 8,413,932 B2 | 4/2013 | De Roche |
| 8,738,278 B2 | 5/2014 | Chen |
| 2002/0047071 A1 | 4/2002 | Illingworth |

FOREIGN PATENT DOCUMENTS

| | | |
|---|---|---|
| CA | 2075043 C | 1/2000 |
| CN | 101052563 A | 10/2007 |
| CN | 201761488 U | 3/2011 |
| CN | 102205841 A | 10/2011 |
| EP | 0513245 A1 | 11/1992 |
| EP | 0661206 A1 | 7/1995 |
| EP | 2727833 A1 | 5/2014 |
| GB | 2094734 A | 9/1982 |
| WO | 9111363 A1 | 8/1991 |
| WO | 0076289 A2 | 12/2000 |
| WO | 2006137857 A2 | 12/2006 |
| WO | 2012057822 A2 | 5/2012 |

METHOD FOR LEVITATION OF AN OBJECT

CROSS-REFERENCE TO RELATED APPLICATION

This application is a divisional of U.S. application Ser. No. 15/412,125, filed Jan. 23, 2017, which claims the benefit of U.S. Provisional Application No. 62/288,093, filed Jan. 28, 2016, which are each hereby incorporated by reference in their entirety.

BACKGROUND OF THE INVENTION

Field of the Disclosure

The present disclosure relates to a levitation device and method and, more particularly, to a compressed gas levitation device and method.

Description of the Related Art

Levitation devices are desirable for use in recreational activities, travel, and lifting, as well as a multitude of other uses, for individual consumers, industrial applications, and government functions. Current compressed gas levitation technologies require significant amounts of positive pressure gas in order to produce levitation. An increase in compressed gas required for levitation directly results in an increase in power requirements for compressed air generation, or significant storage volumes of compressed gas. Current compressed gas generation technologies are not feasible for incorporation into a compressed gas levitation device due to size, weight, power requirement, flow and pressure generation, and cost. Large storage volumes are not feasible for a compressed gas levitation device due to size and weight of the pressurized volume required for sustainable levitation. Some technologies have proposed a skirt design to capture and retain the compressed gas in an enclosure to minimize the amount of compressed gas required to sustain levitation; however, these existing technologies have proven inadequate for sustainable compressed air levitation, as well. Therefore, it would be desirable to reduce the amount of compressed gas required for levitation, in turn reducing power requirements for compressed air generation and storage volumes for compressed gas levitation devices.

SUMMARY OF THE INVENTION

In one embodiment, a levitation device includes a body having a top surface and a bottom surface positioned opposite the top surface, an air reservoir configured to contain a predetermined volume of compressed air, and a thrust arrangement comprising a flow conduit having a primary inlet, a secondary inlet, and an outlet, with the outlet positioned adjacent to the bottom surface of the body. The secondary inlet is in fluid communication with ambient air and the primary inlet is in fluid communication with the air reservoir and positioned upstream from the secondary inlet and the outlet.

The thrust arrangement may be configured to provide a thrust force at the outlet. The primary inlet may be positioned 90 degrees relative to the second inlet. The flow conduit may include a constricted section, with the thrust arrangement configured to provide a Venturi effect with entrainment of ambient air via the secondary inlet to supplement compressed air provided from the primary inlet and the air reservoir. The constricted section may be a section of the flow conduit where a diameter of the flow conduit decreases from a first diameter to a second diameter and subsequently increases back to the first diameter. The constricted section may be a smooth tapering in diameter from the first diameter to the second diameter and back to the first diameter. The thrust arrangement may include at least a first pair of flow conduits and a second pair of flow conduits. The secondary inlets and outlets of each flow conduit may be located 180 degrees from each other in a z-dimension extending perpendicular from an x-y plane defined by the top surface of the body. The secondary inlets may be spaced from the outlets of each conduit in a y-dimension extending from a first end of the body to a second end of the body.

One of the secondary inlets of the first pair of flow conduits may be positioned above one of the outlets of the first pair of flow conduits in the z-dimension. Each of the flow conduits of the first pair of flow conduits may include a constricted section, with the constricted section of one of the flow conduits of the first pair of flow conduits spaced from the other constricted section of the other one of the flow conduits of the first pair of flow conduits in an x-dimension extending perpendicular to a y-dimension extending from a first end of the body to a second end of the body. The body may include a first end and a second end positioned opposite the first end along a longitudinal axis of the body, with the primary inlet and the secondary inlet positioned at about the first end of the body and the outlet is positioned at about the second end of the body. The air reservoir may be defined by a space within the body, with the thrust arrangement received within the body. The air reservoir may be defined by an air cylinder received within the body, with the thrust arrangement received within the body. The body may define an opening configured to receive the air reservoir. An air reservoir supply line may connect the air reservoir to the primary inlet of the flow conduit. The primary inlet may include a nozzle having an orifice.

In a further embodiment, a method for levitation includes: providing a source gas within an air reservoir; flowing the source gas through an orifice to produce a Venturi effect as the source gas exits an outlet; entraining a secondary gas comprising ambient air; creating a pressure decrease at a secondary inlet of the secondary gas; mixing the source gas and the secondary gas to form a tertiary gas mixture, with the tertiary gas mixture including the source gas and the secondary gas, and with the source gas and the secondary gas being mixed in a flow conduit having a constricted section of decreasing diameter and increasing diameter; flowing the tertiary gas mixture through an outlet; creating a pressure increase at the outlet; and inducing levitation through creation of a pressure decrease at the secondary inlet of the secondary gas and a pressure increase at the outlet of the tertiary gas mixture.

The source gas may have a moisture dew point of −20 degrees Fahrenheit, or lower, as measured at 14.7 psia and 72 degrees Fahrenheit, and pressurized to a minimum of 5 psig. The secondary inlet may be located 180 degrees from the outlet in a z-dimension.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1A-15, a levitation device 10 according to one embodiment of the present invention is shown. As provided in more detail below, the levitation device 10 provides levitation with a minimized source gas amount to provide a sustainable levitation device for individual consumers, industry, and government. The source gas used may be from existing compressed air generation technologies, although the levitation device may use gas from one or more of a variety of sources not limited to existing compressed air generation or storage technologies. The levitation device 10 includes a body 12, an air reservoir 14, and a thrust arrangement 16, which are described in detail below.

Referring to FIGS. 1A-8, the body 12 of the levitation device 10 includes a top surface 20, a bottom surface 22 positioned opposite the top surface 20, a first end 24, and a second end 26 positioned opposite the first end 24 along a longitudinal axis of the body 12. The body 12 may be generally planar with the first and second ends 24, 26 of the body 12 having a rounded shape. The body 12 defines an internal space 28 that receives the air reservoir 14 and the thrust arrangement 16. In particular, the air reservoir 14 may be defined by the body 12 such that the body 12 forms a tank configured to contain and store a source gas, such as compressed air. The body 12 may be constructed from lightweight, high strength materials. In one embodiment, the body 12 is an aluminum-lined carbon fiber construction.

Referring again to FIGS. 1A-8, as noted above, the air reservoir 14 is positioned within the body 12 and, in one embodiment, is defined by the internal space 28 within the body 12. The air reservoir 14, however, may be a separate reservoir from the body 12 and may be a commercially available tank that is received within the body 12 or positioned externally from the body 12. The air reservoir 14 is configured to contain and store a predetermined volume of source gas, such as compressed air. In one embodiment, the source gas is stored in the air reservoir 14 at ambient temperature and positive pressure. The temperature of the source gas may be greater than 0 degrees Fahrenheit (F) and less than 200 F and in one non-limiting embodiment is 77 F, although other suitable temperatures may be utilized. The pressure of the source gas may be greater than 5 pounds per square inch gauge (psig) and less than 25,000 psig. In one non-limiting embodiment, the pressure of the source gas is 4,500 psig, although other suitable pressures may be utilized. The source gas may be relatively free of water, having a dew point of no greater than 0 F. In one non-limiting embodiment, the dew point of the source gas is −20 F or less, although other suitable dew points may be utilized. As shown more clearly in FIG. 1A, the pressure within the air reservoir 14 is measured and displayed via a pressure measurement arrangement 30, such as a pressure gauge and/or pressure transmitter. The air reservoir 14 may have a 7500 psig maximum design pressure and 4500 psig standard operating pressure, although other suitable pressures may be utilized.

Figure 13:
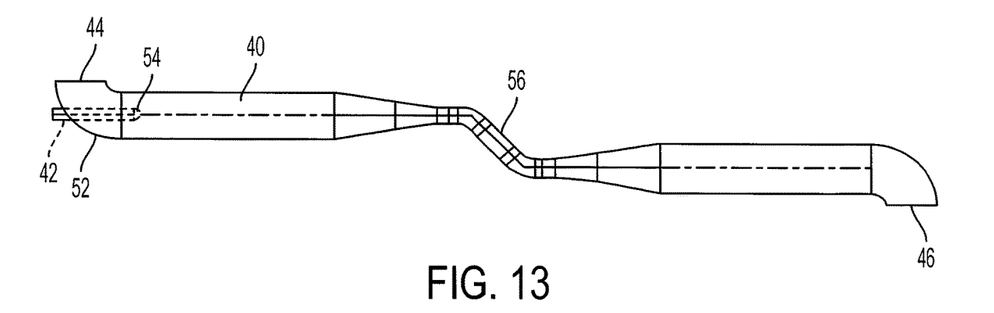
FIG. 13 is a front view of the flow conduit of FIG. 12.
Figure 15:
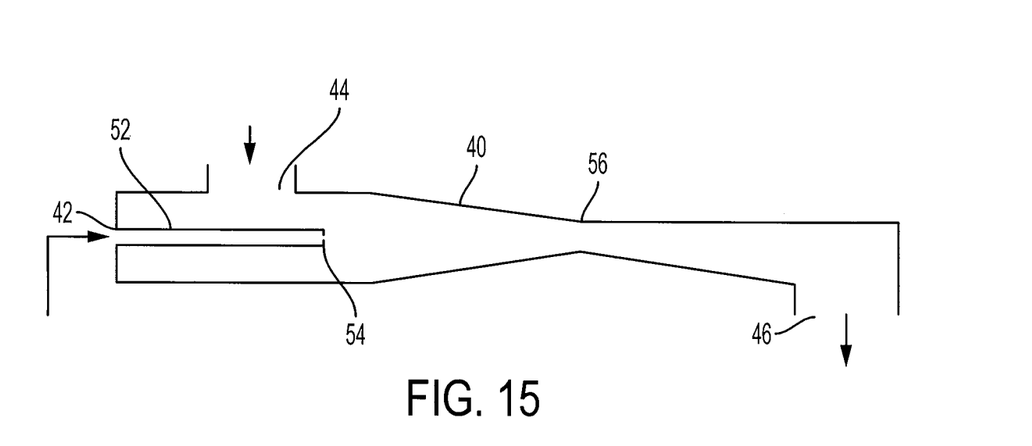
FIG. 15 is a schematic flow diagram of a flow conduit of a thrust arrangement for a levitation device in accordance with an embodiment of the present invention.
Figure 16:
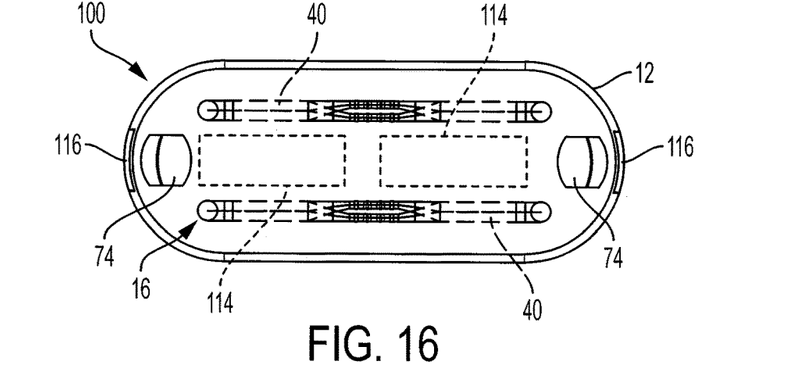
FIG. 16 is a top view of a levitation device in accordance with a further embodiment of the present invention.
Figure 17:
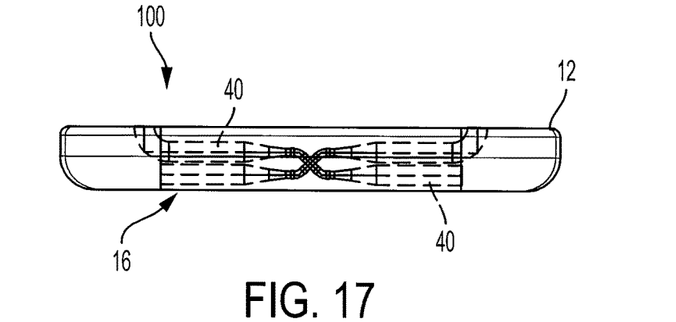
FIG. 17 is a front view of the levitation device of FIG. 16.
Figure 18:
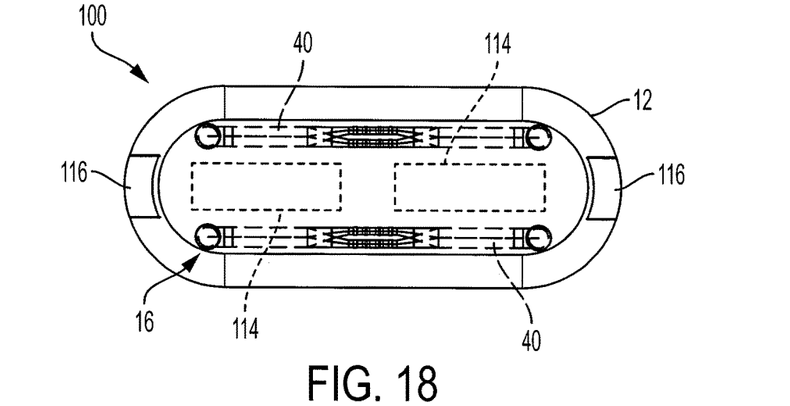
FIG. 18 is a bottom view of the levitation device of FIG. 16.
Figure 19:
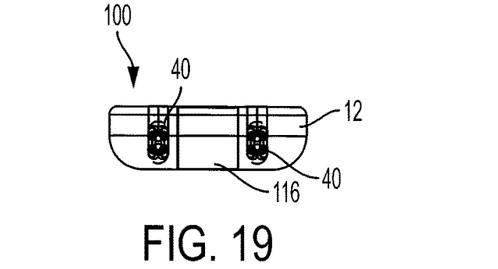
FIG. 19 is a side view of the levitation device of FIG. 16.

Referring to FIGS. 1A-3, 9-13, and 15, the thrust arrangement 16 includes three pairs of flow conduits 40 that are configured to provide a thrust force for levitation of the levitation device 10. Each of the flow conduits 40 has a primary inlet 42, a secondary inlet 44, and an outlet 46. The secondary inlets 44 are positioned adjacent to the top surface 20 of the body 12 and the outlets 46 are positioned adjacent to the bottom surface 22 of the body 12. The secondary inlets 44 are each in fluid communication with ambient air and the primary inlets 42 are each in fluid communication with the air reservoir 14 via an air reservoir supply line 48. The primary inlets 42 each include a nozzle 52 defining an orifice 54. In particular, as shown in FIGS. 13 and 15, the nozzle 52 extends into the flow conduit 40 with the orifice 54 positioned downstream from the secondary inlet 44. The flow conduits 40 and air reservoir supply line 48 may be pipes constructed from lightweight, high strength material, although other suitable configurations and materials for the flow conduits 40 may be provided. For example, the flow conduits 40 may be formed integrally with the body 12 of the levitation device 10. Each of the flow conduits 40 include a constricted section 56 where the flow conduit 40 narrows in diameter or size and subsequently increases in diameter or size. The constricted section 56 is a smooth tapering of the flow conduit 40, although other suitable arrangements may be utilized. The thrust arrangement 16 is configured to provide a Venturi effect with entrainment of ambient air via the secondary inlet 44 to supplement the source gas, such as compressed air, provided from the primary inlet 42 and air reservoir 14. In particular, the nozzle 52 and orifice 54 produce a Venturi effect to cause entrainment of ambient air via the secondary inlet 44 with the constricted section 56 of the flow conduit 40 causing the source gas and the secondary gas to mix and form a tertiary gas mixture as discussed in more detail below.

The production of the Venturi effect per the Bernoulli Principle is governed by the following equation:

$$\frac{\rho v_1^2}{2} + p_1 = \frac{\rho v_2^2}{2} + p_2 = \text{Constant} \quad \text{[Equation 1]}$$

$p$ = pressure $v$ = velocity $\rho$ = density

Air flowing through the nozzles 52 in each of the flow conduits 40 will be controlled by a valve 60, or valves, located downstream from the air reservoir 14 and upstream from the outlets 46. The valve 60 will be used to modulate the flow through the orifices 54. The valve 60 may have a 7500 psig design pressure and 4500 psig standard operating pressure, although other suitable designs may be utilized. The valve 60 may be one of several designs, such as ball, gate, globe, etc. In one non-limiting embodiment, the valve 60 is a full port ball valve.

Since:

$$Q = v_1 A_1 = v_2 A_2 \quad \text{[Equation 2]}$$

Q=flow
A=area

Flow can be determined by the following equation:

$$Q = A_1 \sqrt{\frac{2}{\rho} * \frac{(p_1 - p_2)}{\left(\frac{A_1}{A_2}\right)^2 - 1}} = A_2 \sqrt{\frac{2}{\rho} * \frac{(p_1 - p_2)}{1 - \left(\frac{A_2}{A_1}\right)^2}} \quad \text{[Equation 3]}$$

According to one embodiment, and utilizing the previously described equations, each nozzle 52 may be sized with a discharge orifice 54 of 0.150 millimeter (mm), or 0.00059 inches (in), in order to produce a minimal source air flow rate from the air reservoir 14 of 0.00374 actual cubic feet per minute (acfm), or 1.00 standard cubic foot per minute (scfm), or 4.58 pounds per hour (lb/hr), while providing sufficient force for sustainable levitation as described herein. Based on the orifice area of 0.0177 mm$^2$, or 0.0000274 in$^2$, the resulting velocity of the source air from the air reservoir 14 will be 328 feet per second (ft/s).

All associated energy values can be determined given the velocity and Bernoulli's equation for compressible flow thermodynamics:

$$\frac{v^2}{2} + \Psi + \omega = \omega_o \quad \text{[Equation 4]}$$

$\Psi = gz$, or gravitational potential for Earth's gravity (negligible in this case)

$$\frac{v^2}{2} + \omega = \omega_o$$

$$\omega = \epsilon + \frac{p}{\rho}$$

$\epsilon$ = specific internal energy $\omega$ = enthalpy $\omega_0$ = total enthalpy Due to the decrease in fluid pressure, or stored energy, as air flows through the nozzle orifices 54, kinetic energy increases in the form of increased velocity. As given by the equation below, some energy is lost in the form of heat energy as the gas expands to a new lower pressure after passing through the orifice 54. Bernoulli's equation simplified for energy loss through a reducing orifice is provided as follows:

$$dE = \frac{(p_1 - p_2)}{\rho} \quad \text{[Equation 5]}$$

$dE$ = energy loss

The higher velocity of the air exiting the orifice 54 and entering the flow conduit 40 through the primary inlet 42 entrains a secondary gas stream (ambient) from the secondary inlet 44 for mixing with the source air from the primary inlet 42 and air reservoir 14 within the flow conduit 40. According to one embodiment, entrainment of the secondary gas is accomplished by positioning the primary inlet 42 and nozzle orifice 54 about 90 degrees from the secondary inlet 44 and positioned upstream of the constricted section 56 of the flow conduit 40 as shown in FIGS. 13 and 15. The secondary gas stream will be ambient air at ambient temperature and atmospheric pressure, or 14.7 pounds per square inch absolute (psia). Through entrainment of the secondary air, a vacuum, or negative pressure, will be created at the secondary inlet 44. Entrainment of the secondary air stream will result in 9.5 psia, or −5.2 psig, vacuum at the secondary inlet 44. As noted above, and shown in FIGS. 9 and 10, the thrust arrangement 16 includes three pairs of flow conduits 40 with each pair of conduits 40 having the flow conduits 40 being nested with each other such that the secondary inlet 44 of a first flow conduit 64 is positioned vertically above the outlet 46 of a second flow conduit 66. Similarly, the secondary inlet 44 of the second flow conduit 66 is positioned vertically above the outlet 46 of the first flow conduit 64. As discussed above, the secondary inlets 44 are positioned adjacent the top surface 20 of the body 12 and the outlets 46 are positioned adjacent the bottom surface 22 of the body 12. The constricted sections 56 of the first and second flow conduits 64, 66 are spaced from each other in a direction extending transversely to a longitudinal axis of the levitation device 10.

Mixing of the primary and secondary air streams within the flow conduits 40 of reducing diameter at the constricted sections 56 and subsequent increasing diameter, as shown in FIGS. 9-13, will result in production of a tertiary gas stream of a moderate pressure at the outlets 46. The resulting pressure of the tertiary gas stream is determined by calculation of the mass and energy balances provided previously. According to one embodiment, the tertiary stream will be discharged at a positive pressure of 4.0 psig at the outlet 46. The tertiary stream will be discharged to the atmosphere. The tertiary stream will discharge through the outlet 46 located on the bottom surface 22 of the body 12, or at a point below the secondary inlet 44 and being separated from the secondary inlet 44 by 180 degrees as shown, for example, in FIG. 10A.

By incorporating one or more nozzle(s) 52 and orifice(s) 54, secondary inlets 44, and outlets 46 for the tertiary gas mixture, a desired lifting force can be created for use in levitation. The resultant force is calculated using the areas of both the secondary inlet 44 and the outlet 46 in the following equation:

$$P = \frac{F}{A} \quad \text{[Equation 6]}$$

$P$ = pressure $F$ = force $A$ = area

According to one embodiment, the amount of force required for lifting is 200 pounds (lb), and the amount of nozzles 52 and orifices 54, secondary inlets 44, and outlets 46 required for generating 200 lb of force totals six (6) each as shown in FIGS. 1-10. The time of levitation is dictated directly by the air reservoir 14 pressure requirement, the air reservoir 14 gas usage, and the size of the air reservoir 14, which, given an air reservoir 14 gas pressure requirement of 85% of design pressure and the source gas flow rate from the air reservoir 14 noted above, is approximately 30 minutes (min).

According to a further embodiment, the amount of force required for lifting is 130 lb, and the amount of nozzles 52 and orifices 54, secondary inlets 44, and outlets 46 required for generating 130 lb of force totals four (4) each. Given an air reservoir 14 pressure requirement of 85% of design pressure and the source gas flow rate from the air reservoir 14 noted above, is approximately 45 min for this embodiment.

According to yet another embodiment, the amount of force required for lifting is 65 lb, and the amount of nozzles 52 and orifices 54, secondary inlets 44, and outlets 46 for generating 65 lb of force totals two (2) each. Given an air reservoir 14 pressure requirement of 85% of design pressure and the source gas flow rate from the air reservoir 14 noted above, is approximately 90 min for this embodiment.

Figure 1A:
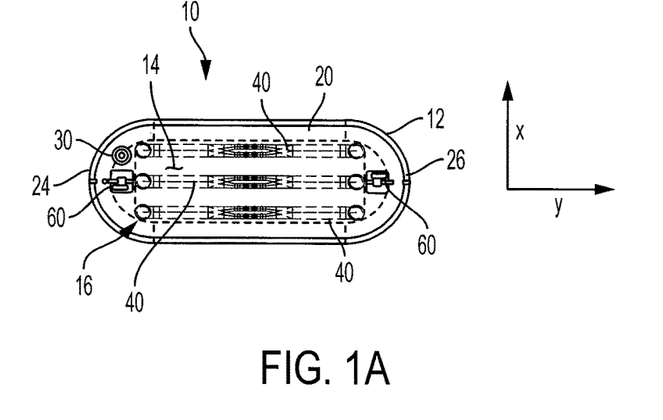
FIG. 1A is a top view of a levitation device in accordance with an embodiment of the present invention.
Figure 1B:
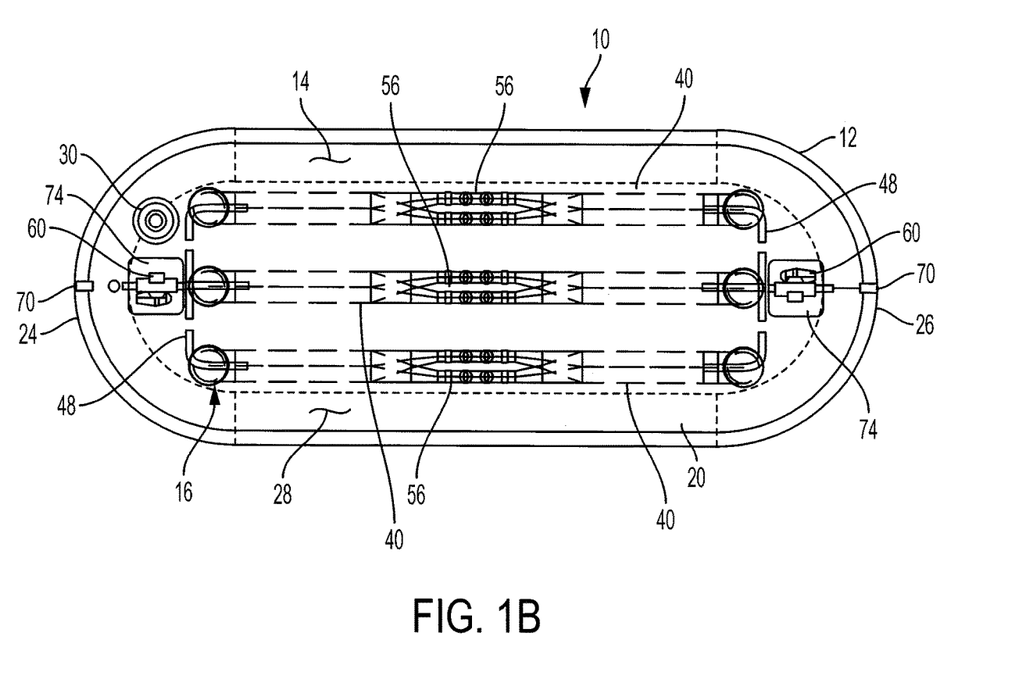
FIG. 1B is an enlarged view of the levitation device shown in FIG. 1A.
Figure 2A:
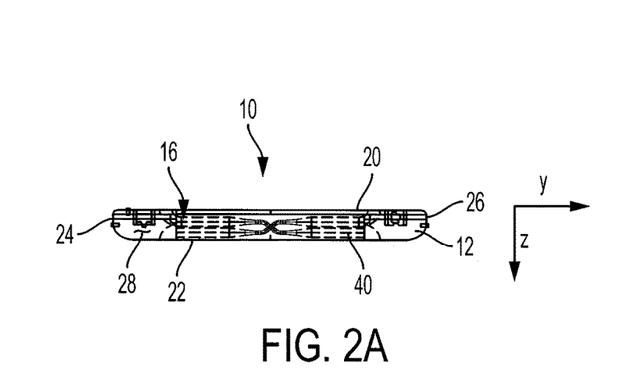
FIG. 2A is a front view of the levitation device of FIG. 1A.
Figure 2B:
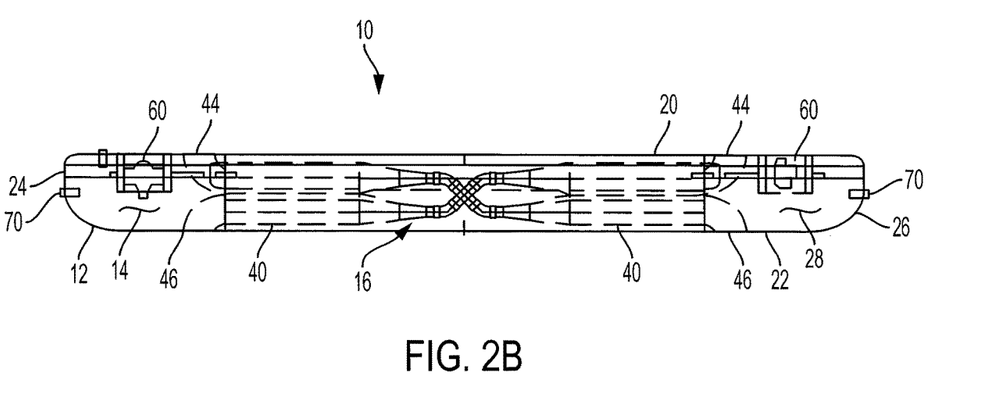
FIG. 2B is an enlarged view of the levitation device shown in FIG. 2A.
Figure 3:
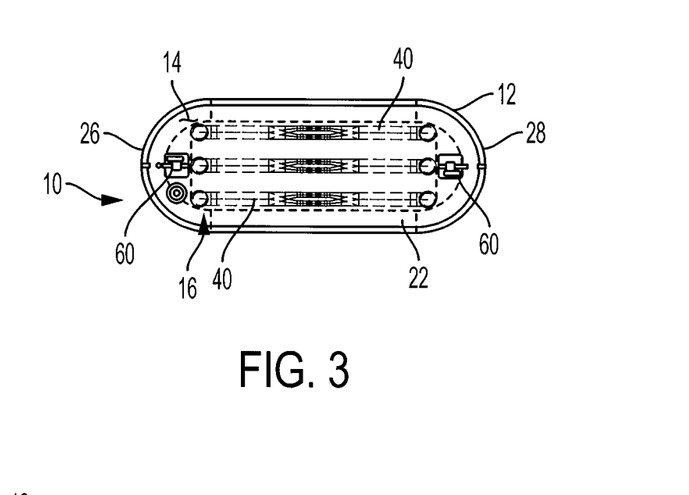
FIG. 3 is a bottom view of the levitation device of FIG. 1A.
Figure 4:
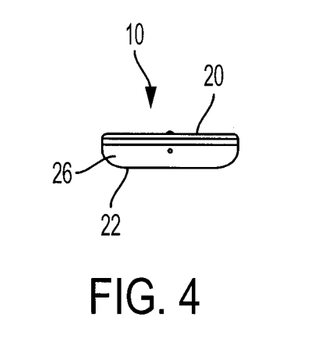
FIG. 4 is a left side view of the levitation device of FIG. 1A.
Figure 5:
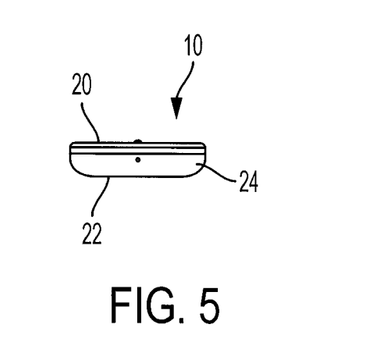
FIG. 5 is a right side view of the levitation device of FIG. 1A.
Figure 6:
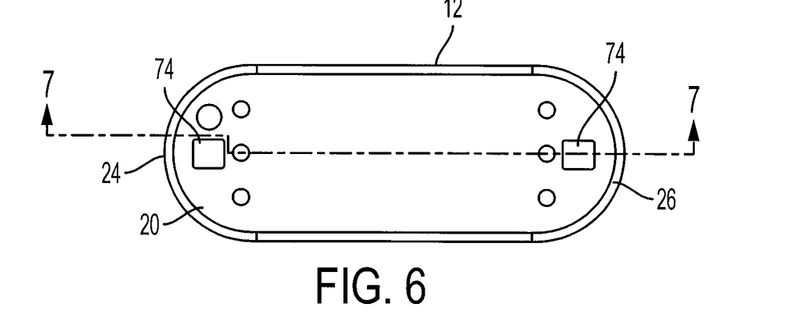
FIG. 6 is a top view of a body of a levitation device in accordance with an embodiment of the present invention.
Figure 7:
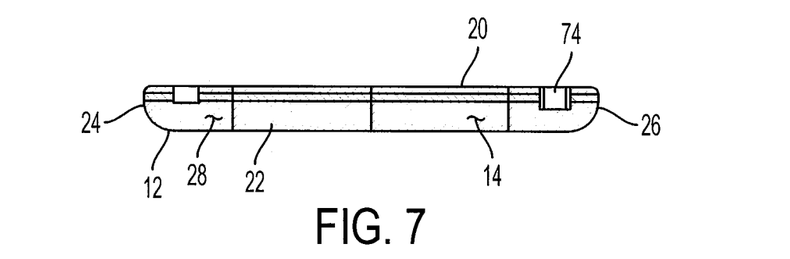
FIG. 7 is a sectional view along line 7-7 shown in FIG. 6.
Figure 8:
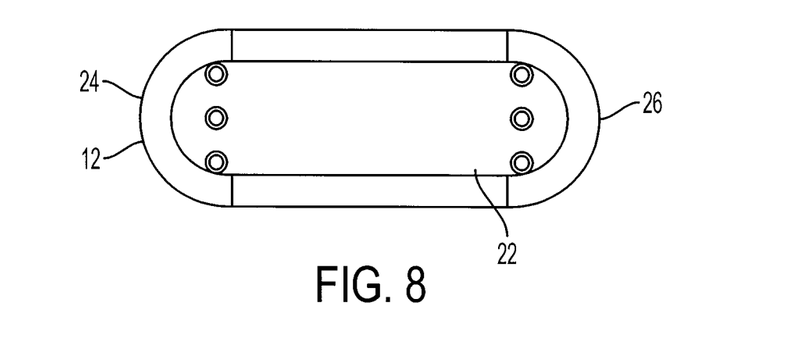
FIG. 8 is a bottom view of the body of FIG. 6.
Figure 9:
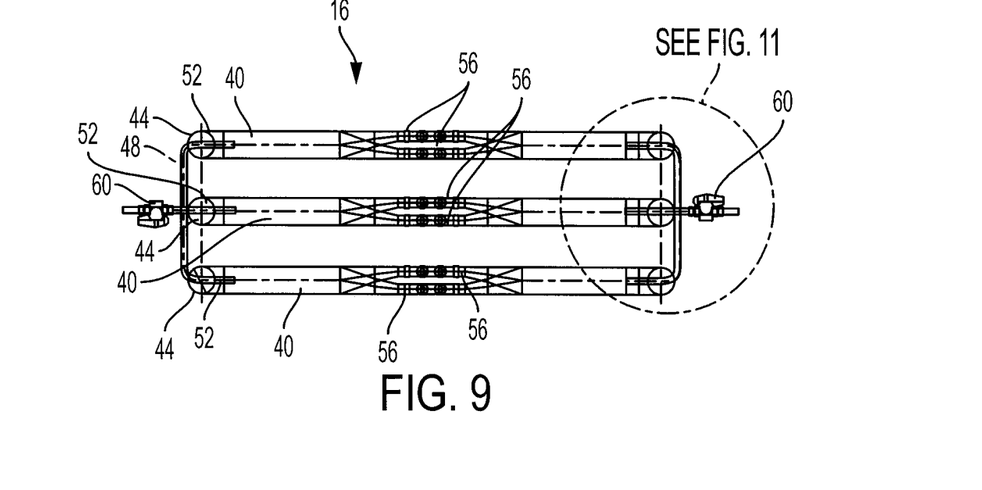
FIG. 9 is a top view of a thrust arrangement of a levitation device in accordance with an embodiment of the present invention.
Figure 10A:
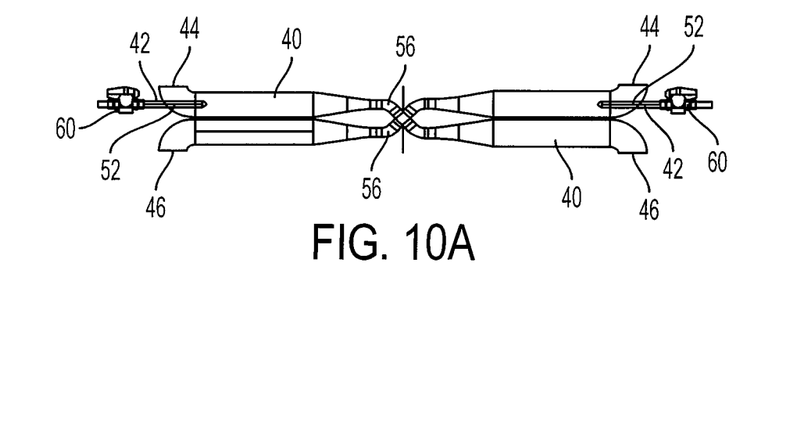
FIG. 10A is a front view of the thrust arrangement of FIG. 9.
Figure 10B:
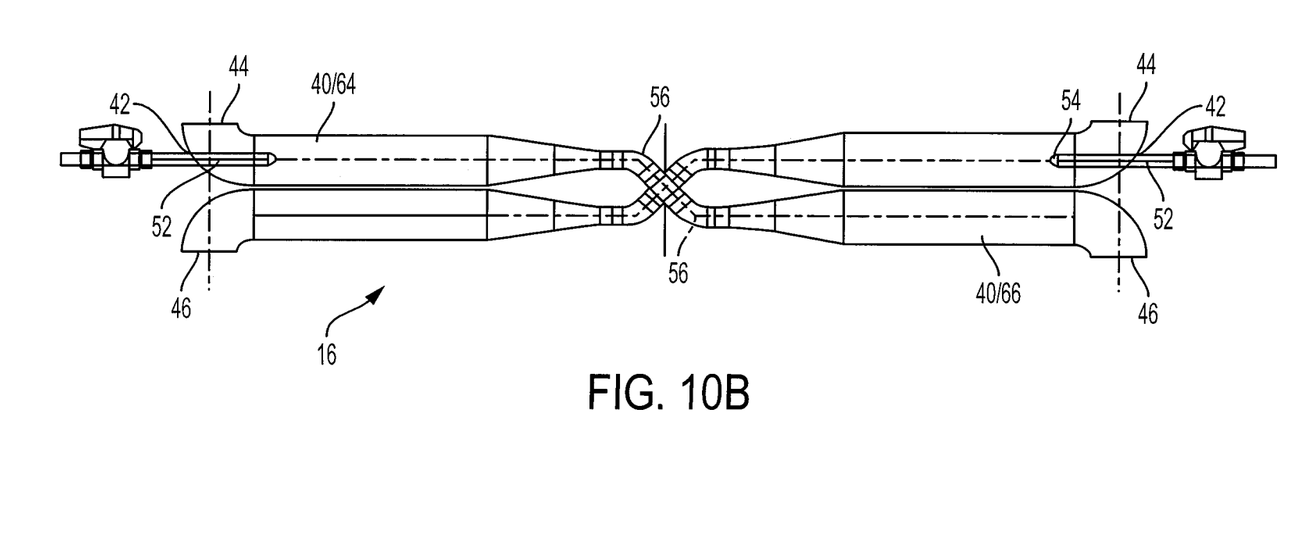
FIG. 10B is an enlarged view of the thrust arrangement shown in FIG. 10A.
Figure 11:
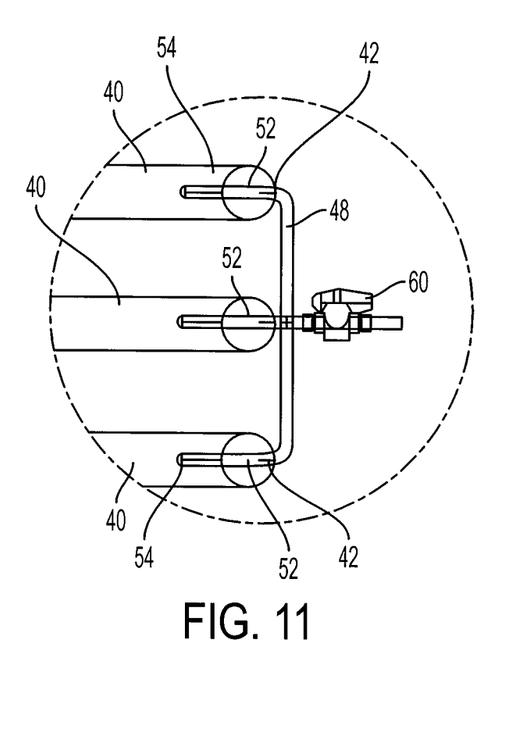
FIG. 11 is an enlarged view of the area indicated in FIG. 9.
Figure 12:
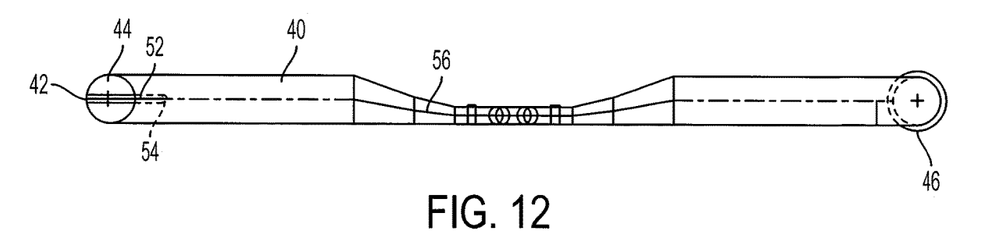
FIG. 12 is a top view of a portion of a flow conduit of a thrust arrangement for a levitation device in accordance with an embodiment of the present invention.

Referring to FIGS. 1A-13, assuming an orientation where the width of the device 10 is in the x-dimension (as shown in FIG. 1A), the length of the device 10 is in the y-dimension (as shown in FIGS. 1A and 2A), and the depth of the device 10 is in the z-dimension (as shown in FIG. 2A), the structural design of the levitation device 10 may include nozzles 52 and orifices 54, secondary inlets 44, and outlets 46 located spatially as to allow for each nozzle pair 52 to be oriented 180 degrees from one another in the y-dimension, while maintaining chiral symmetry in the same z-plane and x-plane for self-balancing of one embodiment of the invention. As noted previously, the secondary inlets 44 and outlets 46 of each flow conduit 40 flow path will be located 180 degrees from one another in the z-dimension, while maintaining the same x-plane but separated by some length of the device 10 in the y-direction, both located equidistant from the ends 24, 26 of the body 12 in the y-direction. Hence, one embodiment of the device 10 may include six (6) nozzles 52 and orifices 54, three (3) located on each side 24, 26 of the body 12 in the y-direction, each one (1) located 180 degrees in the y-dimension and facing an opposing one (1) of the opposite three (3) nozzles 52 and orifices 54, and each set of two (2) nozzles 52 and orifices 54 located in the same z-plane and x-plane with chiral symmetry along these planes. Along the length, in the y-dimension, of each flow conduit 40, the flow conduit 40 for primary and secondary gas mixing will begin to decrease in diameter at the constricted section 56 to a minimum diameter where the flow conduit 40 begins increasing in diameter as the flow conduit 40 spatially wraps below, in the z-dimension, the opposing constricted section 56 of the opposing flow conduit 40.

In one embodiment of the invention, geometrically, the secondary inlets 44 and outlets 46 are of circular cross-sectional shape, but can be of any geometric shape, such as square, rectangular, triangular, hexagonal, etc., as long as the flow conduit 40 decreases in diameter with a subsequent increase in diameter along the y-dimension prior to the outlet 46. Also, in one embodiment of the invention, geometrically, the secondary inlet 44 and outlet 46 are of circular cross-sectional shape, but can be of any geometric shape, such as square, rectangular, triangular, hexagonal, etc., as long as the cross-sectional surface area maintained is appropriate for the generation of the force desired.

According to one embodiment, the body 12 of the levitation device 10 itself defines the air reservoir 14. In other words, the air reservoir 14 may be formed integrally with the body 12 of the levitation device 10. Thus, the levitation device 10 can be filled directly via a quick-connect high pressure fitting 70, with the fitting 70 and device 10 internals being rated for a maximum pressure of 7500 psig and housing a standard operating pressure of 4500 psig for function, although other suitable arrangements may be utilized. As noted above, the body 12 may be constructed from aluminum-lined carbon fiber materials of construction and required quality assurance and quality control testing regulations for 4500 psig compressed air vessels. The only volumes within the device 10 not contributing to the source gas/compressed air storage volume of the device 10 are a pressure gauge housing 30, the control valve boxes 74 and the flow conduits 40.

According to one embodiment, the structural design of the device 10, having nozzles 52 located 180 degrees opposite one another in the y-dimension but still located in the same z-plane and x-plane, provides for effective noise cancelation, reducing the decibels produced during operation. Due to high velocities created within the levitation device 10, as described previously, sound waves are created within each nozzle orifice 54, which propagate outward. Providing nozzles 52 located 180 degrees opposite one another in the y-dimension but still located in the same z-plane and x-plane, the resultant waves of the same amplitude and inverted phase combine to form a new wave of lower amplitude through interference. In addition, the aluminum lined carbon fiber material of construction, in one embodiment, additionally decreases the decibels produced due to the combination of both materials and the amount of layers required for 7500 psig pressure rating regulations.

Figure 14:
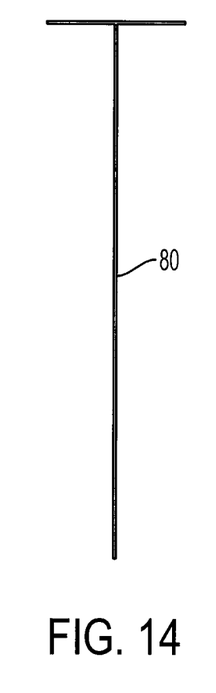
FIG. 14 is a front view of a handlebar arrangement for a levitation device in accordance with an embodiment of the present invention.

According to one embodiment, the levitation device 10 is designed structurally for stable levitation in the z-dimension and the user of the device 10 propels the device 10 in the x- and y-dimensions during use. In order to stop the device 10, the user simply presses down on the tail or first end 24 of the body 12 of the levitation device 10 to create a friction force with the ground opposite the direction of travel and effectively slowing the speed of travel. As shown in FIG. 14, the levitation device 10 may also include a carbon fiber, removable, ergonomic handlebar 80 for improved control during use of the levitation device 10.

Referring to FIGS. 16-19, a levitation device 100 according to a further embodiment is shown. The levitation device 100 is similar to the levitation device 10 described above and shown in FIGS. 1A-15. The levitation device 100, however, only includes two pairs of flow conduits 40. Further, the levitation device 100 includes one or more air reservoir 114 received within the body 12 of the levitation device 100. The air reservoir(s) 114 is a separate air cylinder or tank received within the body 12 of the levitation device 100. The air reservoir(s) 114 may be, for example, a 4500 psig air cylinder, although other suitable air cylinders may be utilized. Although received within the body 12, the air reservoir(s) 114 may be positioned externally from the body 12 and mounted to the body 12 or worn by a user of the levitation device 100. The air reservoir(s) 114 is connected to the primary inlets 42 of the flow conduits 40 via the air reservoir supply lines 48 in the same manner as discussed above in connection with the levitation device 10. The body 12 of the levitation device 100 may be fabricated in one piece using a 3D printing process or any other suitable manufacturing process. The flow conduits 40, air reservoir supply lines 48, air reservoir(s) 114 may be added separately to the body 12. The body 12 of the levitation device 100 also includes openings 116 for receiving the air reservoir(s) 114, although other suitable arrangements may be utilized.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method for levitation comprising:
   flowing a source gas through an orifice to produce a Venturi effect as the source gas exits an outlet;
   entraining a secondary gas comprising ambient air;
   creating a pressure decrease at a secondary inlet of the secondary gas;
   mixing the source gas and the secondary gas to form a tertiary gas mixture, the tertiary gas mixture comprising the source gas and the secondary gas, wherein the source gas and the secondary gas are mixed in a flow conduit having a constricted section of decreasing diameter and increasing diameter;
   flowing the tertiary gas mixture through an outlet;
   creating a pressure increase at the outlet; and
   inducing levitation through creation of a pressure decrease at the secondary inlet of the secondary gas and a pressure increase at the outlet of the tertiary gas mixture.

2. The method of claim 1, wherein the source gas comprises a moisture dew point of −20 degrees Fahrenheit, or lower, as measured at 14.7 psia and 72 degrees Fahrenheit, and pressurized to a minimum of 5 psig.

3. The method of claim 1, wherein the secondary inlet is located 180 degrees from the outlet in a z-dimension.

4. The method of claim 1, wherein the constricted section is a smooth tapering in diameter from a decreasing diameter section to an increasing diameter section.

5. The method of claim 1, wherein the secondary inlet induces a vacuum on atmospheric air.

6. The method of claim 1, further comprising: providing the source gas within a reservoir.

7. The method of claim 6, wherein the reservoir comprises a compressed air reservoir.

8. A method for levitation using a levitation device comprising a body, an air reservoir configured to contain a predetermined volume of a source gas, and a thrust arrangement comprising a flow conduit having a primary inlet, a secondary inlet, and an outlet, the method comprising:
   flowing the source gas through an orifice to produce a Venturi effect as the source gas exits the outlet;
   entraining a secondary gas comprising ambient air;
   creating a pressure decrease at the secondary inlet of the secondary gas;
   mixing the source gas and the secondary gas to form a tertiary gas mixture, the tertiary gas mixture comprising the source gas and the secondary gas, wherein the source gas and the secondary gas are mixed in a constricted section of the flow conduit;
   flowing the tertiary gas mixture through the outlet;
   creating a pressure increase at the outlet; and
   inducing levitation through creation of a pressure decrease at the secondary inlet of the secondary gas and a pressure increase at the outlet of the tertiary gas mixture.

9. The method of claim 8, wherein the source gas comprises a moisture dew point of −20 degrees Fahrenheit, or lower, as measured at 14.7 psia and 72 degrees Fahrenheit, and pressurized to a minimum of 5 psig.

10. The method of claim 8, wherein the secondary inlet is located 180 degrees from the outlet in a z-dimension.

11. The method of claim 8, wherein the constricted section is a smooth tapering in diameter from a decreasing diameter section to an increasing diameter section.

12. The method of claim 8, wherein the secondary inlet induces a vacuum on atmospheric air.

\* \* \* \* \*